United States Patent
Shin et al.

(10) Patent No.: US 12,304,479 B2
(45) Date of Patent: May 20, 2025

(54) VEHICLE DISPLAY DEVICE, DISPLAY METHOD, AND STORAGE MEDIUM

(71) Applicant: TOYOTA JIDOSHA KABUSHIKI KAISHA, Toyota (JP)

(72) Inventors: Akinori Shin, Toyota (JP); Takahiro Hirota, Aichi-ken (JP); Yuting Zhang, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 17/663,338

(22) Filed: May 13, 2022

(65) Prior Publication Data

US 2022/0363251 A1    Nov. 17, 2022

(30) Foreign Application Priority Data

May 14, 2021  (JP) ................................. 2021-082639

(51) Int. Cl.
*B60W 30/12*    (2020.01)
*G06V 20/58*    (2022.01)

(52) U.S. Cl.
CPC ............ *B60W 30/12* (2013.01); *G06V 20/58* (2022.01); *B60W 2420/403* (2013.01); *B60W 2552/53* (2020.02); *B60W 2554/4041* (2020.02)

(58) Field of Classification Search
CPC ......... B60W 30/12; B60W 2554/4041; B60W 2552/53; B60W 2420/403; G06V 20/58
See application file for complete search history.

(56) References Cited

U.S. PATENT DOCUMENTS

| | | | |
|---|---|---|---|
| 2002/0167589 A1* | 11/2002 | Schofield | ................... B60R 1/26 |
| | | | 348/E7.086 |
| 2011/0301813 A1* | 12/2011 | Sun | ....................... B62D 15/029 |
| | | | 348/148 |
| 2012/0235805 A1* | 9/2012 | Nogami | ................... G06T 7/215 |
| | | | 340/441 |

(Continued)

FOREIGN PATENT DOCUMENTS

| | | |
|---|---|---|
| CN | 108622087 A | 10/2018 |
| CN | 110723209 A | 1/2020 |

(Continued)

OTHER PUBLICATIONS

German Office Action dated Feb. 26, 2024 in German Patent Application No. 102022111630.1 with English translation.

(Continued)

*Primary Examiner* — Peter D Nolan
*Assistant Examiner* — Wae L Louie
(74) *Attorney, Agent, or Firm* — Dickinson Wright, PLLC (57) ABSTRACT

A vehicle display device displays a predetermined image at a display region showing a view ahead of a vehicle, and includes a processor. The processor recognizes a travel lane in which the vehicle is traveling, recognizes a position of the vehicle relative to the travel lane, determines whether or not there is a possibility of the vehicle departing from the travel lane based on the recognized travel lane and the position of the vehicle, and displays, at the display region, an image of a stereoscopic object disposed along the travel lane in a case in which the processor has determined that there is a possibility of the vehicle departing from the travel lane.

10 Claims, 10 Drawing Sheets

(56) References Cited

U.S. PATENT DOCUMENTS

| | | | |
|---|---|---|---|
| 2016/0209647 A1* | 7/2016 | Fürsich | G02B 27/0075 |
| 2016/0284218 A1* | 9/2016 | Ejiri | G08G 1/166 |
| 2017/0039438 A1* | 2/2017 | Homma | G06V 20/58 |
| 2017/0154554 A1 | 6/2017 | Tanaka et al. | |
| 2018/0148072 A1* | 5/2018 | Kamiya | B60W 50/14 |
| 2018/0157036 A1* | 6/2018 | Choi | G09G 3/001 |
| 2018/0178839 A1* | 6/2018 | Ide | B62D 15/029 |
| 2018/0265097 A1 | 9/2018 | Suzuki et al. | |
| 2020/0023899 A1 | 1/2020 | Takahashi et al. | |
| 2020/0349366 A1* | 11/2020 | Takemura | H04N 13/286 |
| 2022/0107497 A1* | 4/2022 | Murata | B60K 35/00 |
| 2022/0363251 A1* | 11/2022 | Shin | G06V 20/588 |
| 2024/0181879 A1* | 6/2024 | Nose | B60W 30/12 |

FOREIGN PATENT DOCUMENTS

| | | |
|---|---|---|
| DE | 11 2015 001 544 T5 | 12/2016 |
| JP | 2010026759 A | 2/2010 |
| JP | 2011032833 A | 2/2011 |
| JP | 2012046914 A | 3/2012 |
| JP | 2012172447 A | 9/2012 |
| JP | 2015-210644 A | 11/2015 |
| JP | 2018-103862 A | 7/2018 |
| JP | 2018140646 A | 9/2018 |
| WO | 2011/070783 A1 | 6/2011 |

OTHER PUBLICATIONS

Winner et al., Handbuch Fahrerassistenzsysteme, 3. Aufl, SpringerVieweg 2015, S. 937-957 with English translation.

* cited by examiner

VEHICLE DISPLAY DEVICE, DISPLAY METHOD, AND STORAGE MEDIUM

CROSS-REFERENCE TO RELATED APPLICATION

This application is based on and claims priority under 35 USC 119 from Japanese Patent Application No. 2021-082639 filed on May 14, 2021, the disclosure of which is incorporated by reference herein.

BACKGROUND

Technical Field

The present disclosure relates to a vehicle display device, a display method, and a storage medium.

Related Art

Japanese Patent Application Laid-open (JP-A) No. 2018-140646 discloses a vehicle display device (head-up display device) that displays a warning image that indicates a direction of departure of a vehicle in a case in which there is a possibility of the vehicle departing from a lane during travel. This vehicle display device displays a planar image of a pair of boundary lines that indicate the boundaries of a travel lane on a road. The image of a pair of boundary lines indicates a departure direction of the vehicle by highlighting an image of the boundary line at the side in the direction of departure by using differences in color, luminance, thickness, and the like.

Incidentally, as a means of warning a driver of departure from a lane, a rumble strip is known, in which convex blocks are provided on a road in a strip configuration. The rumble strips are effective in preventing lane departure accidents since they make a driver intuitively aware of the danger of lane departure by vibration and sound produced when traveling over the block. Accordingly, it is desirable for a vehicle display device that warns of lane departure to also make the driver intuitively aware of the risk of lane departure.

However, it is difficult to make a driver intuitively aware of the risk of lane departure simply by presenting a departure direction in a planar image that shows a lane boundary as in JP-A No. 2018-140646.

SUMMARY

The present disclosure has been accomplished in consideration of the foregoing matters, and an object thereof is to provide a vehicle display device, a display method, and a storage medium capable of intuitively conveying the risk of lane departure to a vehicle occupant.

A vehicle display device according to a first aspect of the present disclosure is a vehicle display device that displays a predetermined image at a display region indicating a forward view of a vehicle, the device including: a lane recognition section configured to recognize a travel lane in which the vehicle is traveling; a vehicle position recognition section configured to recognize a position of the vehicle relative to the travel lane; a lane departure determination section configured to determine whether or not there is a possibility of the vehicle departing from the travel lane based on the recognized travel lane and the position of the vehicle; and a display instruction section configured to display, at the display region, an image of a stereoscopic object disposed along the travel lane in a case in which it has been determined that there is a possibility of the vehicle departing from the travel lane.

According to the first aspect, the vehicle display device displays a predetermined image at a display region indicating a forward view of the vehicle. The vehicle display device recognizes the travel lane in which the vehicle is traveling and the position of the vehicle relative to the travel lane, and based on these factors, determines whether or not there is a possibility of the vehicle departing from the travel lane. In a case in which the vehicle display device has determined that there is a possibility of departure from the travel lane, the vehicle display device displays, at the display region, an image of a stereoscopic object disposed along the travel lane. As a result, since the vehicle display device is able to impart to the occupant a visual effect suggesting that the vehicle has traveled over a three-dimensional object, it is possible for the risk of lane departure to be intuitively conveyed.

A vehicle display device according to a second aspect of the present disclosure is the configuration of the first aspect, in which the lane departure determination section determines that there is a possibility of the vehicle departing from the travel lane in a case in which a distance between the vehicle and a boundary line in a path width direction of the travel lane is equal to or less than a predetermined threshold value.

According to the vehicle display device of the second aspect, in a case in which the vehicle has approached the boundary line in the path width direction of the travel lane, it is determined that there is a possibility of the vehicle departing from the travel lane and the image of the stereoscopic object is displayed at the display region. As a result, an occupant can be made aware of the risk of lane departure in a case in which the vehicle is traveling in a state in which there is a high likelihood of departure from a travel lane.

A vehicle display device according to a third aspect of the present disclosure is the configuration of the first aspect, further including a travel direction recognition section configured to recognize a travel direction of the vehicle, and in which the lane departure determination section determines that there is a possibility of the vehicle departing from the travel lane in a case in which an angle formed by a boundary line in a path width direction of the travel lane and the travel direction of the vehicle is equal to or greater than a predetermined threshold value.

According to the vehicle display device of the third aspect, in a case in which the angle formed by the boundary line in the path width direction of the travel lane and the travel direction of the vehicle is equal to or greater than a predetermined threshold value, it is determined that there is a possibility of the vehicle departing from the travel lane and the image of the stereoscopic object is displayed at the display region. As a result, during travel by the vehicle on a route with a high likelihood of departure from the travel lane, such as when the vehicle has advanced along a travel lane with a sharp curve, the occupant can be made aware of the risk of lane departure.

A vehicle display device according to a fourth aspect of the present disclosure is the configuration of any one of the first aspect to the third aspect, in which the display instruction section displays the image of the stereoscopic object at the display region before the vehicle departs from the travel lane.

According to the fourth aspect, because the image of the stereoscopic object is displayed at the display region before the vehicle departs from the travel lane, enabling the risk of lane departure to be recognized, it is possible to effectively prevent a lane departure accident caused by the vehicle.

A vehicle display device according to a fifth aspect of the present disclosure is the configuration of any one of the first aspect to the fourth aspect, in which the display instruction section displays the image of the stereoscopic object at the display region such that the stereoscopic object appears to move along the travel lane from a background side to a foreground side of the display region.

According to the vehicle display device of the fifth aspect, since the image of a stereoscopic object is displayed as if moving along the travel lane from a background side to a foreground side of the display region, the occupant can experience a realistic sensation as if the stereoscopic object disposed on the travel path is approaching the vehicle. As a result, the vehicle display device is able to more effectively impart, to the occupant, a visual effect suggesting that the vehicle is traveling over the stereoscopic object.

A vehicle display device according to a sixth aspect of the present disclosure is the configuration of any one of the first aspect to the fifth aspect, in which the display instruction section displays the image of the stereoscopic object at the display region such that the stereoscopic object appears to vibrate.

According to the vehicle display device of the sixth aspect, since an image of an oscillating stereoscopic object is displayed at the display region, an occupant can experience a realistic sensation as if the vehicle is vibrating as a result of traveling over a three-dimensional object. As a result, the vehicle display device is able to more effectively impart, to the occupant, a visual effect suggesting that the vehicle is traveling over a three-dimensional object.

A vehicle display device according to a seventh aspect of the present disclosure is the configuration of the sixth aspect, in which, when displaying the image of the stereoscopic object at the display region, the display instruction section changes at least one of an oscillation frequency or an oscillation amplitude of the image of the stereoscopic object in accordance with a distance between the vehicle and a boundary line in a path width direction of the travel lane.

According to the seventh aspect, since the oscillation frequency or oscillation amplitude of the image of the stereoscopic object can be changed in accordance with the distance between the vehicle and the boundary line in the path width direction of the travel lane, the intensity of the visual effect imparted to the occupant can be adjusted in accordance with the likelihood of lane departure. For example, by shortening the oscillation frequency or increasing the oscillation amplitude of the image of the stereoscopic object as the distance between the boundary line of the travel lane and the vehicle decreases, the visual effect whereby an occupant feels as if the vehicle has traveled over a three-dimensional object can be enhanced. As a result, the vehicle display device is able to make an occupant intuitively aware of the degree of risk of lane departure.

A vehicle display device according to an eighth aspect of the present disclosure is the configuration of any one of the first aspect to the seventh aspect, in which the display region is configured as a projection plane projected by a head-up display device at a front part of the vehicle relative to a driver's seat, and the display instruction section displays the image of the stereoscopic object at the display region along the travel lane in a view ahead of the vehicle as viewed through the display region.

According to the eighth aspect, the display region showing the view ahead of the vehicle is configured as a projection plane projected by a head-up display device at a front part of the vehicle relative to a driver's seat. Further, the image of the stereoscopic object is displayed along a travel lane that is viewed through the display region. In this way, since, in the vehicle display device, the stereoscopic object is displayed so as to be integrated with the view ahead of the driver's seat, it is possible for the occupant of the driver's seat to recognize the risk of lane departure without significantly moving his or her line of sight.

A display method according to a ninth aspect of the present disclosure is a method of displaying a predetermined image at a display region showing a view ahead of a vehicle, the method including recognizing a travel lane in which the vehicle is traveling, recognizing a position of the vehicle relative to the travel lane, determining whether or not there is a possibility of the vehicle departing from the travel lane based on the recognized travel lane and the position of the vehicle, and displaying, at the display region, an image of a stereoscopic object disposed along the travel lane in a case in which it has been determined that there is a possibility of the vehicle departing from the travel lane.

As described above, according to the display method according to the ninth aspect, the risk of lane departure can be intuitively conveyed to the occupant.

A program according to a tenth aspect of the present disclosure is a program that causes a predetermined image to be displayed at a display region showing a view ahead of a vehicle, the program being executable by a computer to recognize a travel lane in which the vehicle is traveling, to recognize a position of the vehicle relative to the travel lane, to determine whether or not there is a possibility of the vehicle departing from the travel lane based on the recognized travel lane and the position of the vehicle, and in a case in which it has been determined that there is a possibility of the vehicle departing from the travel lane, to display, at the display region, an image of a stereoscopic object disposed along the travel lane.

As described above, according to the program according to the tenth aspect, the risk of lane departure can be intuitively conveyed to the occupant.

According to the present disclosure, the risk of lane departure can be intuitively conveyed to the occupant.

BRIEF DESCRIPTION OF THE DRAWINGS

Exemplary embodiments of the present invention will be described in detail based on the following figures, wherein.

DETAILED DESCRIPTION

Figure 1:
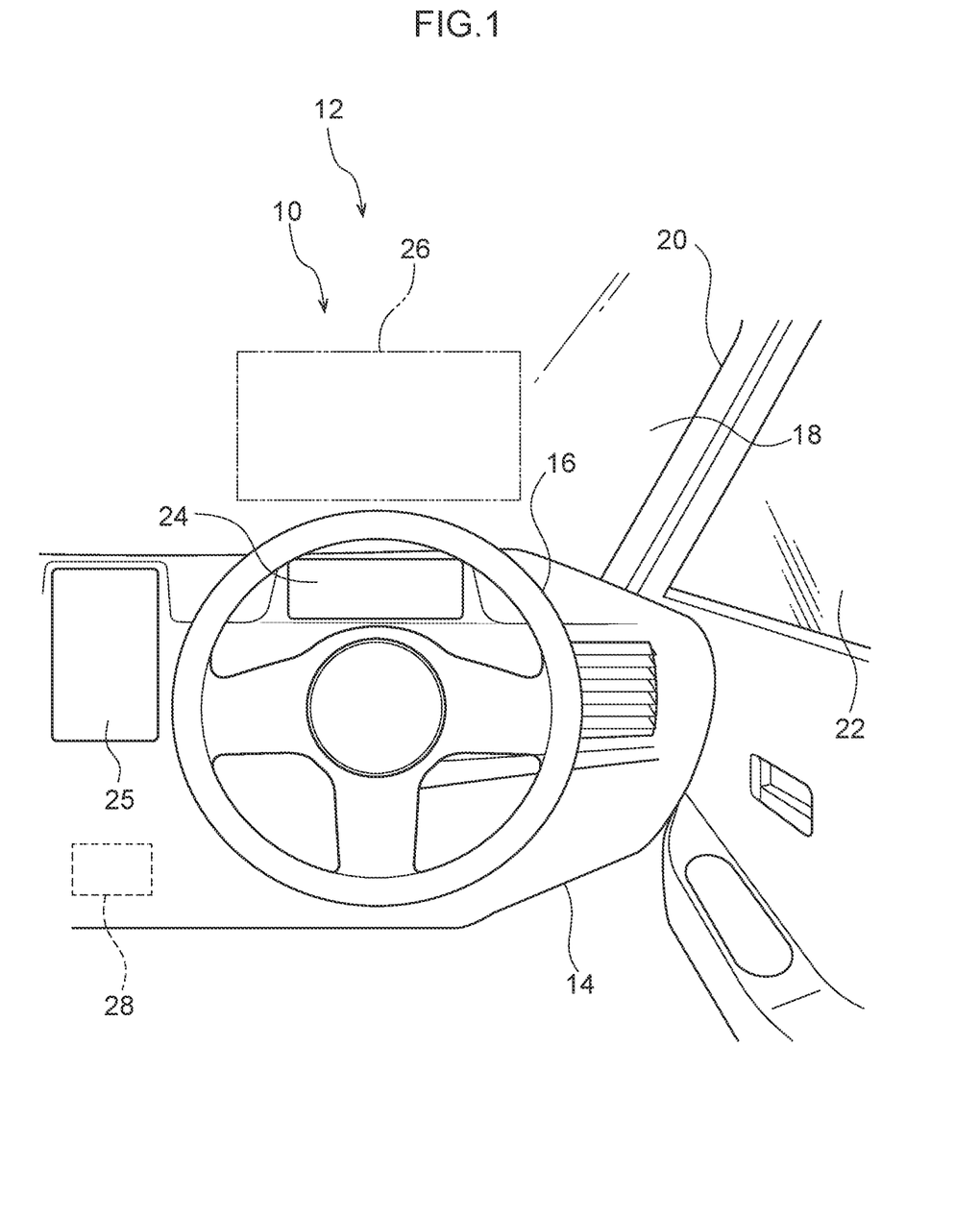
FIG. 1 is a schematic diagram illustrating a front part inside a vehicle cabin, viewed from a vehicle rearward side, of a vehicle to which a vehicle display device according to the present exemplary embodiment has been applied.

Explanation follows regarding a vehicle 12 to which a vehicle display device 10 according to an exemplary embodiment has been applied, with reference to the drawings. As an example, the vehicle 12 of the present exemplary embodiment is configured so as to be capable of switching between autonomous driving and manual driving. Autonomous driving is a mode of travel of a vehicle in which some or all of the operation of an accelerator, a brake, a direction indicator, steering, and the like is performed automatically. Manual driving is a mode of travel of a vehicle in which a driver performs all driving operations (operation of an accelerator, a brake, a direction indicator, steering, and the like). As illustrated in FIG. 1, an instrument panel 14 is provided at a front part inside the vehicle cabin of the vehicle 12.

The instrument panel 14 extends in the vehicle width direction, and a steering wheel 16 is provided at a vehicle right side of the instrument panel 14. Namely, in the present exemplary embodiment, as an example, a right hand drive vehicle is configured with a steering wheel 16 provided on the right side, and a driver's seat is installed on the right side of the vehicle.

A windshield glass 18 is provided at a front end part of the instrument panel 14. The windshield glass 18 is disposed at a vehicle front side of the driver's seat, and extends in a vehicle vertical direction and a vehicle width direction to partition the vehicle cabin interior from an exterior of the vehicle cabin.

The vehicle right side end of the windshield glass 18 is fixed to a front pillar 20 on the vehicle right side. The front pillar 20 extends in the vehicle vertical direction, and the windshield glass 18 is fixed to an inner side end part of the front pillar 20 in the vehicle width direction. A front end part of a front side glass 22 is fixed to an outer side end part of the front pillar 20 in the vehicle width direction. A left side end part of the windshield glass 18 is fixed to a front pillar (not shown) on the left side of the vehicle.

Here, the instrument panel 14 is provided with a first display section 24 that has a display region for a predetermined image. The first display section 24 is configured by a meter display provided toward the vehicle front relative to the driver's seat at a right side part of the instrument panel 14 when viewed in the vehicle width direction. The meter display configures a part of a meter display device (not shown) connected to various meter devices installed in the vehicle 12. The first display section 24 is provided at a position that enters the field of view in a state in which the driver has oriented their line of sight toward the vehicle front.

The windshield glass 18 is provided with a second display section 25 that has a display region for a predetermined image. The second display section 25 is configured by a display provided at a center part of the instrument panel 14 in the vehicle width direction, at a vehicle front side of the driver's seat.

The windshield glass 18 is provided with a third display section 26 that has display region for a predetermined image. The third display section 26 is installed at a vehicle upper side of the first display section 24, and is configured by a projection plane projected by a head-up display device 44 (see FIG. 2). Specifically, the head-up display device 44 is provided at a vehicle front side relative to the instrument panel 14, and is configured such that an image is projected from the head-up display device 44 onto the third display section 26 of the windshield glass 18; namely, the third display section 26 is configured by the windshield glass 18 serving as a projection plane of the head-up display device 44.

(Hardware Configuration of Vehicle Display Device 10)

Figure 2:
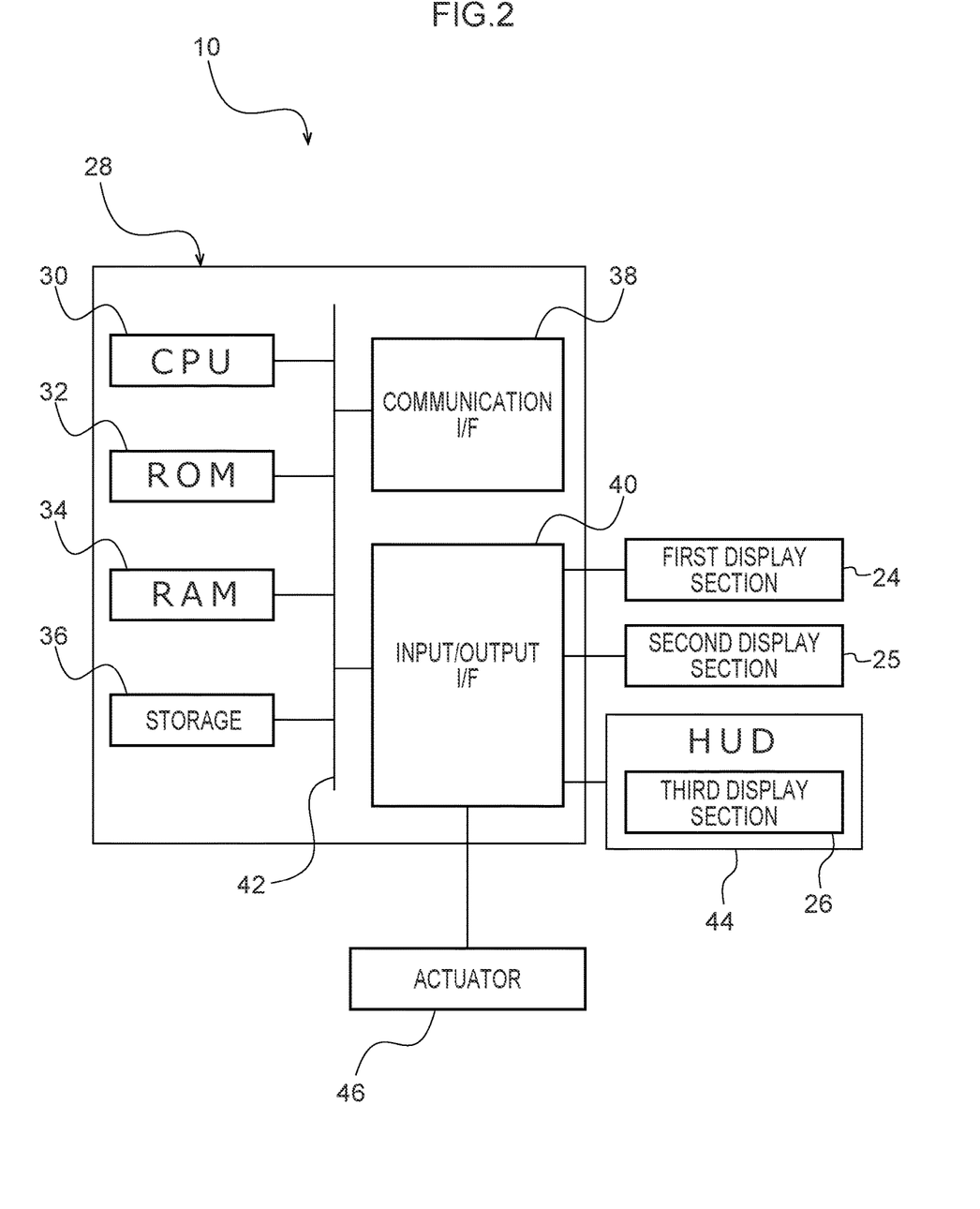
FIG. 2 is a block diagram illustrating a hardware configuration of a vehicle display device according to the present exemplary embodiment.

The vehicle 12 is provided with an electronic control unit (ECU) 28 as a control section. FIG. 2 is a block diagram illustrating a hardware configuration of the vehicle display device 10. As illustrated in FIG. 2, the ECU 28 of the vehicle display device 10 includes a central processing unit (CPU: processor) 30, read only memory (ROM) 32, random access memory (RAM) 34, storage 36, a communication interface 38, and an input/output interface 40. These respective configurations are communicably connected to each other via a bus 42. The CPU 30 is an example of a processor, and the RAM 34 is an example of a memory.

The CPU 30 is a central processing unit that executes various programs and controls various components. Namely, the CPU 30 reads a program from the ROM 32 or the storage 36, and executes the program using the RAM 34 as a workspace. The CPU 30 controls the respective configurations described above and performs a variety of computation processing in accordance with programs stored in the ROM 32 or the storage 36.

The ROM 32 stores various programs and various data. The RAM 34 serves as a workspace that temporarily stores programs and data. The storage 36 is configured by a hard disk drive (HDD) or a solid state drive (SSD), and stores various programs including an operating system, as well as various data. In the present exemplary embodiment, a program for performing display processing, various data, and the like, are stored in the ROM 32 or the storage 36.

The communication interface 38 is an interface for the vehicle display device 10 to communicate with a server (not shown) and other devices and, for example, a protocol such as the Ethernet (registered trademark), LTE, FDDI, or Wi-Fi (registered trademark) is used.

The input/output interface 40 is connected to the first display section 24, the second display section 25, the head-up display device 44 that causes a predetermined image to be projected onto the third display section 26, and an actuator 46. The actuator 46 includes a steering actuator, an accelerator actuator, and a brake actuator, and the steering actuator performs steering of the vehicle 12. The accelerator actuator effects acceleration of the vehicle 12. The brake actuator effects deceleration of the vehicle 12 by controlling braking. A camera (not shown) that captures an image of the periphery of the vehicle 12, sensors for enabling autonomous driving of the vehicle 12, a GPS device, and the like, are connected to the input/output interface 40.

(Functional Configuration of Vehicle Display Device 10)

The vehicle display device 10 implements various functions using the above-described hardware resources. Explanation follows regarding functional configurations implemented by the vehicle display device 10, with reference to FIG. 3.

Figure 3:
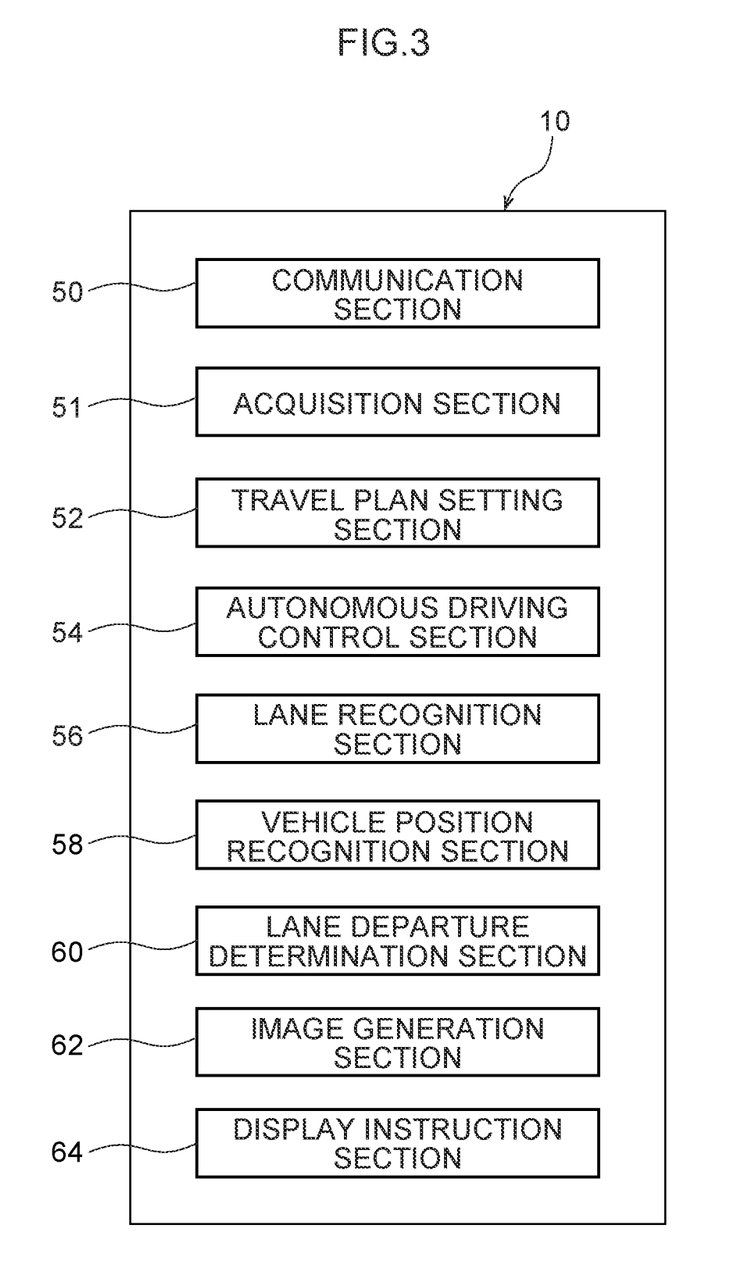
FIG. 3 is a block diagram illustrating a functional configuration of a vehicle display device according to the present exemplary embodiment.

As illustrated in FIG. 3, the functional configuration of the vehicle display device 10 includes a communication section 50, an acquisition section 51, a travel plan setting section 52, an autonomous driving control section 54, a lane recognition section 56, a vehicle position recognition section 58, a lane departure determination section 60, an image generation section 62, and a display instruction section 64. The respective functional configurations are implemented by the CPU 30 reading and executing programs stored in the ROM 32 or the storage 36.

The communication section 50 transmits and receives data to and from an external server and other devices via the communication interface 38. For example, map data and traffic conditions data stored in a server are sent and received. Further, the communication section 50 may be configured to perform inter-vehicle communication with vehicles in the periphery.

The acquisition section 51 acquires the traveling environment of the vehicle 12 as peripheral information from an external sensor (not shown) via the input/output interface 40. The external sensor includes at least one of a camera that images a predetermined range around the vehicle 12, a millimeter-wave radar that transmits scanning waves over a predetermined range, or a LIDAR (Light Detection and Ranging/Laser Imaging Detection and Ranging) scanner that scans a predetermined range. The "peripheral information" includes, for example, the path width of a travel lane 70 (see FIG. 4A, FIG. 4B, and FIG. 5) of the vehicle 12, as well as other vehicles traveling near the vehicle 12, obstacles, and the like.

The travel plan setting section 52 sets a travel plan for the vehicle 12. Specifically, a travel plan from a current location to a destination is set by an occupant inputting the destination.

The autonomous driving control section 54 controls switching between manual driving and autonomous driving of the vehicle 12. Further, in a case in which the driving mode of the vehicle 12 has been switched to autonomous driving, the autonomous driving control section 54 effects autonomous driving of the vehicle 12 according to an established travel plan, while taking into consideration position information and environment information regarding the periphery of the vehicle 12. Specifically, autonomous travel of the vehicle 12 is effected by controlling the actuator 46.

The lane recognition section 56 has a function of recognizing a travel lane in which a vehicle is traveling. Specifically, based on images captured by the camera ahead of the vehicle 12, the white lines drawn on the road surface are analyzed and the travel lane is recognized. Recognition of a travel lane includes recognition of the shape of the travel lane and recognition of the path width of the travel lane. The lane recognition section 56 may recognize the travel lane of the vehicle 12 based on the vehicle position information acquired by a GPS device and high-precision map information.

The vehicle position recognition section 58 has a function of recognizing the position of the vehicle relative to the travel lane. Specifically, the position of the vehicle 12 relative to the travel lane is estimated based on images captured by the camera toward the front of the vehicle 12. The estimation of the position of the vehicle 12 includes estimation of the position of the vehicle 12 relative to a boundary line (such as a white line) in a path width direction of a travel lane, and estimation of a travel direction of the vehicle 12. The vehicle position recognition section 58 may recognize the position and travel direction of the vehicle 12 relative to the travel lane based on vehicle position information acquired by a GPS device and high-precision map information.

Figure 4A:
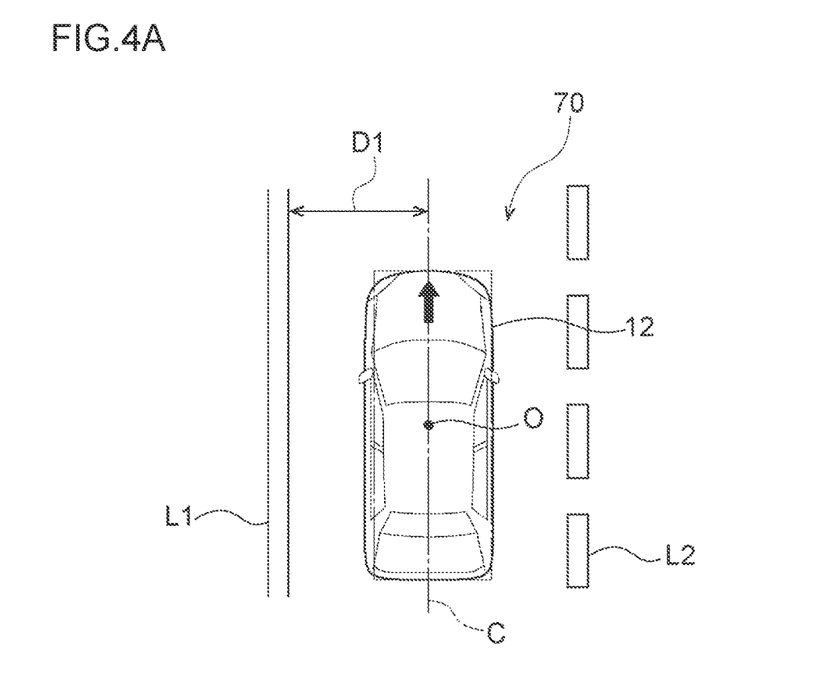
FIG. 4A is a plan view schematically illustrating a vehicle during travel, and illustrating a distance between a boundary line in a path width direction of a travel lane and the vehicle.

The lane departure determination section 60 determines whether or not there is a possibility of the vehicle departing from the travel lane, based on the travel lane and the position of the vehicle recognized by the lane recognition section 56 and the vehicle position recognition section 58. Specifically, as illustrated in FIG. 4A, in a case in which a distance D1 between the boundary line in the path width direction of the travel lane 70 and the vehicle 12 is equal to or less than a predetermined threshold value, it is determined that there is a possibility of the vehicle 12 departing from the travel lane 70. FIG. 4A illustrates a distance D1 between a white line L1 indicating a boundary line on the left side of the travel lane 70 in the path width direction and the vehicle 12. Although FIG. 4A illustrates only the distance D1 between the vehicle 12 and the white line L1 at the left side of the vehicle 12, the lane departure determination section 60 can similarly perform determination based on the distance between the vehicle 12 and the white line L2 at the right side of the vehicle 12.

Figure 4B:
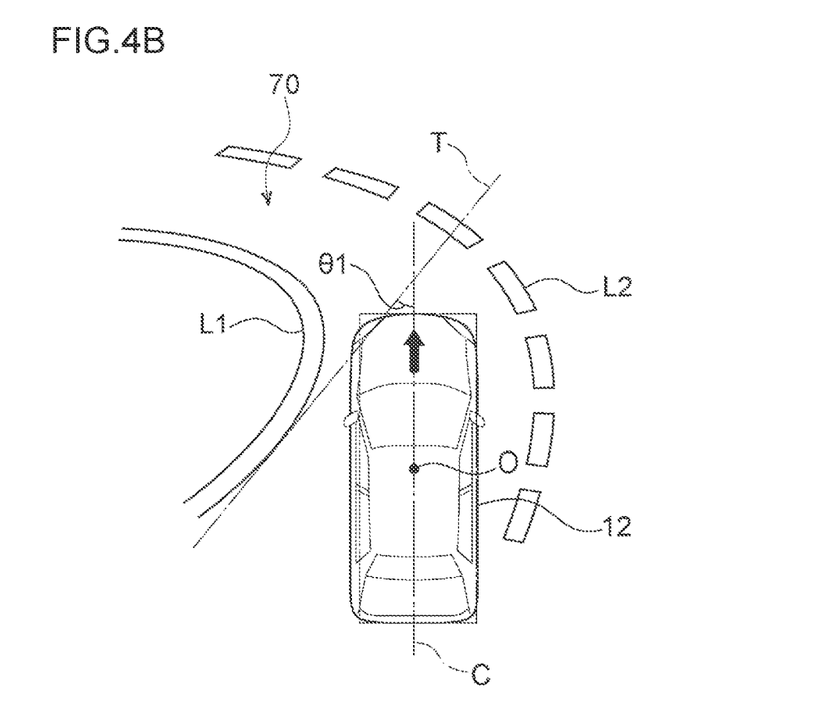
FIG. 4B is a plan view schematically illustrating a vehicle during travel, and illustrating an angle formed by a boundary line of a travel lane and a travel direction of the vehicle.

As illustrated in FIG. 4B, in a case in which an angle $\theta 1$ formed by the boundary line in the path width direction of the travel lane 70 and the travel direction of the vehicle is equal to or greater than a predetermined threshold value, the lane departure determination section 60 may determine that there is a possibility of the vehicle 12 departing from the travel lane 70. FIG. 4B illustrates a travel direction (vehicle centerline direction) of the vehicle 12 as a straight line C, and illustrates a tangential direction of a white line L1 located to the left in the path width direction, relative to a reference position O of the vehicle 12, as a straight line T. The reference position O of the vehicle 12 is, for example, a center position of the vehicle 12. In the present exemplary embodiment, as an example, the angle $\theta 1$ formed by the straight line C and the straight line T is configured as the angle $\theta 1$ formed by the boundary line in the path width direction of the travel lane 70 and the travel direction of the vehicle.

The angle $\theta 1$ formed by the boundary line in the path width direction and the travel direction of the vehicle in the travel lane 70 increases as the tangential direction of the white line L1 and the travel direction of the vehicle 12 diverge. Accordingly, for example, in a case in which the vehicle 12 has traveled to a point on a sharp curve of a travel lane, and further, the formed angle $\theta 1$ becomes equal to or greater than a predetermined threshold value, it may be determined that there is a possibility of the vehicle 12 departing from the travel lane 70.

Although FIG. 4B illustrates only the angle $\theta 1$ formed by the tangential direction of the white line L1 on the left side of the vehicle 12 and the travel direction of the vehicle 12, the lane departure determination section 60 can similarly make a determination based on the angle formed by the tangential direction of the white line L2 on the right side of the vehicle 12 and the travel direction of the vehicle 12.

The image generating section 62 generates an image to be displayed at the third display section 26, which is a projection plane of the head-up display device 44. The images generated by the image generation section 62 include, for example, a meter display M (see FIG. 5) that indicates the travel speed of the vehicle 12, and various images intended to assist manual driving and autonomous driving.

In particular, in the present exemplary embodiment, in a case in which the lane departure determination section 60 has determined that there is a possibility of the vehicle 12 departing from a travel lane, the image generation section 62 displays a stereoscopic image B (see FIG. 7) in the display region of the third display section 26. The stereoscopic image B is, for example, an image of a block-shaped stereoscopic object. As illustrated in FIG. 8, in the present exemplary embodiment, plural stereoscopic images B are displayed at the third display section 26 along the travel lane 70. The details of the method of displaying the stereoscopic image B are described below.

The display instruction section 64 has a function of displaying images generated by the image generation section 62 at the display region of the third display section 26, and a function of deleting the images displayed at the third display section 26.

Figure 5:
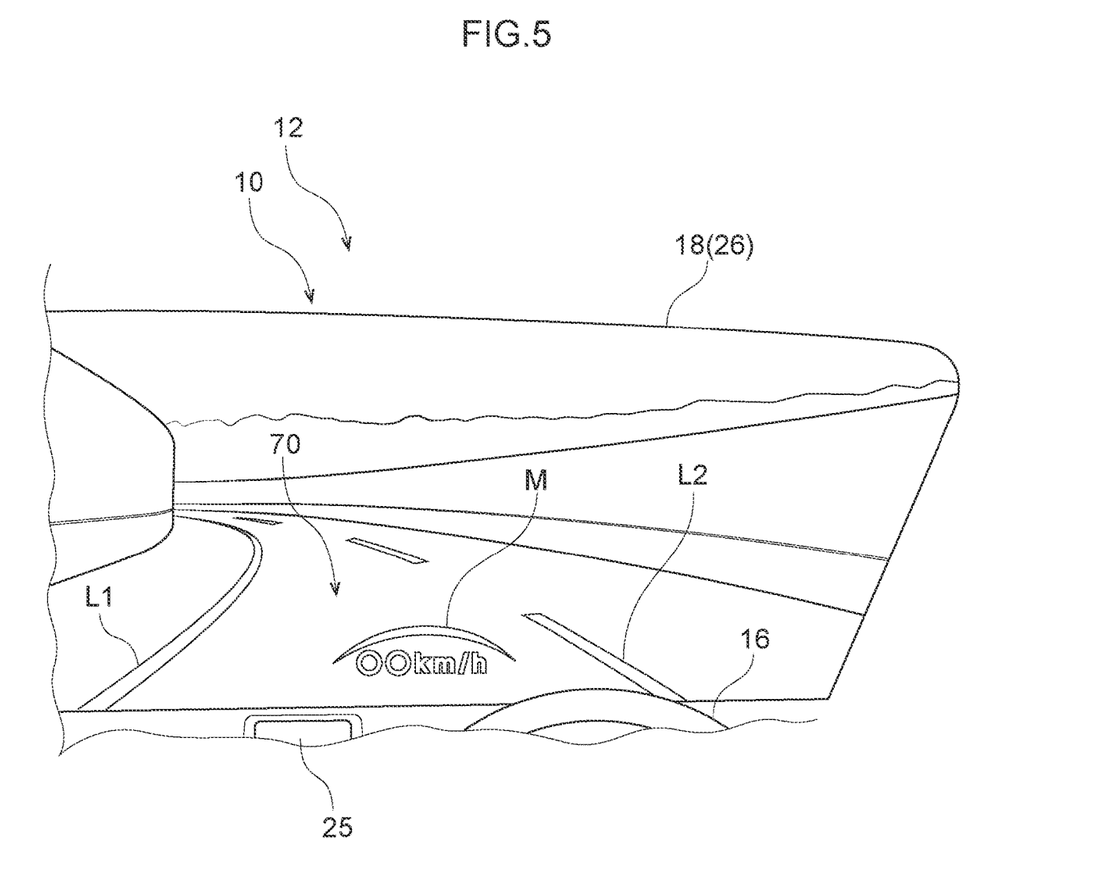
FIG. 5 is a diagram illustrating a display example of a display region according to the present exemplary embodiment.

The display instruction section 64 displays, for example, various images at the display region of the third display section 26 so as to cause the various images to be integrated with the forward view of the vehicle 12 that is viewed by an occupant of the driver's seat through the third display section 26 (windshield glass 18). FIG. 5 illustrates an example of the third display section 26 as viewed by an occupant of the driver's seat. In this drawing, the meter display M is displayed at the display region of the third display section 26 so as to avoid positions overlapping with the white lines L1, L2 on the road, in consideration of the visibility of the occupant of the driver's seat.

In particular, in the present exemplary embodiment, in a case in which the lane departure determination section 60 has determined that there is a possibility of the vehicle 12 departing from the travel lane, the display instruction section 64 causes the stereoscopic image B to be displayed at the display region along the travel lane 70 in the view ahead of the vehicle 12 that is viewed through the third display section 26 (windshield glass 18). Accordingly, when the stereoscopic image B is displayed at the third display section 26, for an occupant of the driver's seat who has viewed the third display section 26, a visual effect as if a block-shaped three-dimensional object is disposed in the vicinity of the travel lane 70 can be provided.

Further, in a case in which, after it has been determined at the lane departure determination section 60 that there is a possibility of the vehicle 12 departing from the travel lane, it is then determined that there is no possibility of departing from the travel lane, the display instruction section 64 deletes the stereoscopic image B from the third display section 26.

(Mechanism)

Next, explanation is provided regarding the mechanism of the present exemplary embodiment.

(Display Processing)

Figure 6:
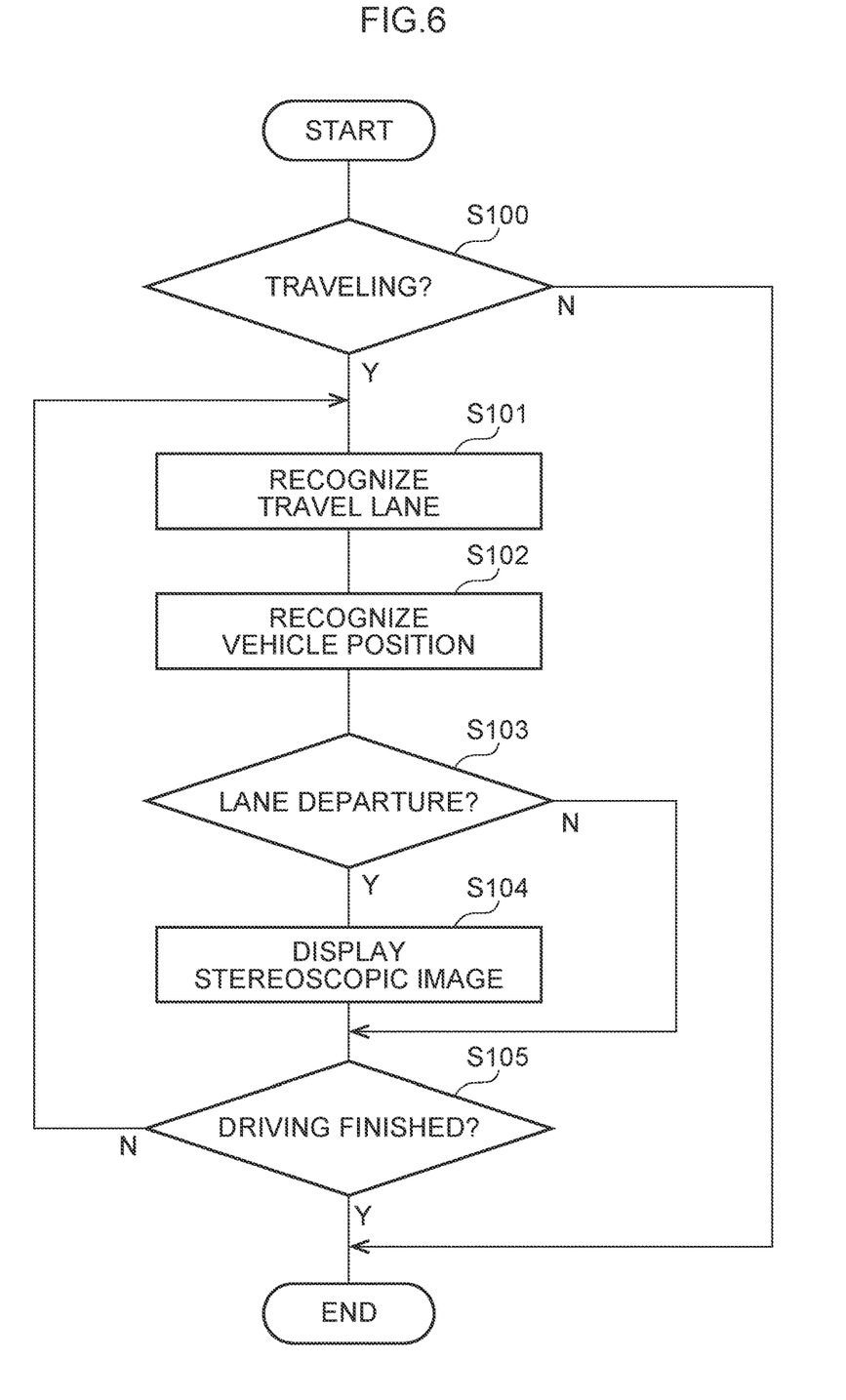
FIG. 6 is a flowchart illustrating an example of a flow of display processing in the present exemplary embodiment.

Explanation follows regarding an example of display processing to display a stereoscopic image B at the third display section 26, which is a projection plane of the head-up display device 44, with reference to the flowchart illustrated in FIG. 6. This display processing is executed by the CPU 30 reading a display program from the ROM 32 or the storage 36, and expanding and executing the display program in the RAM 34.

As illustrated in FIG. 6, at step S100, the CPU 30 determines whether or not the vehicle 12 is traveling. In a case in which the CPU 30 has determined that the vehicle 12 is traveling, the processing transitions to step S101. Further, in a case in which the CPU 30 determines at step S100 that the vehicle 12 is not traveling, the display processing is ended.

At step S101, based on the functionality of the lane recognition section 56, the CPU 30 recognizes the travel lane 70 in which the vehicle 12 is traveling.

At step S102, based on the functionality of the vehicle position recognition section 58, the CPU 30 recognizes the position of the vehicle 12 relative to the travel lane 70.

At step S103, based on the functionality of the lane departure determination section 60, the CPU 30 determines whether or not there is a possibility of the vehicle 12 departing from the travel lane 70. Specifically, as illustrated in FIG. 4A, in a case in which the distance D1 between the boundary line (white lines L1, L2) in the path width direction of the travel lane 70 and the vehicle 12 is equal to or less than a predetermined threshold value, it is determined that there is a possibility of the vehicle 12 departing from the travel lane 70. As an example, the threshold value of the distance D1 is set at a distance at which the vehicle 12 does not travel onto the white lines L1, L2 of the travel lane 70. This enables the occupant to be warned of the risk of lane departure before the vehicle 12 departs from the travel lane 70, in a step described below.

Further, as illustrated in FIG. 4B, in a case in which the angle θ1 formed by the boundary line (white lines L1, L2) in the path width direction of the travel lane 70 and the travel direction of the vehicle 12 is equal to or greater than a predetermined threshold value, the CPU 30 determines that there is a possibility of the vehicle 12 departing from the travel lane 70. Accordingly, for example, in a case in which the vehicle 12 travels straight ahead in a travel lane 70 following a sharp curve, the angle θ1 becomes equal to or greater than a predetermined threshold value, and it is determined that there is a possibility of departure from the travel lane 70.

In a case in which the CPU 30 determines at step S103 that there is a possibility of the vehicle 12 departing from the travel lane 70, the processing transitions to step S104. Further, in a case in which it is determined that there is no possibility of the vehicle 12 departing from the travel lane 70, the processing transitions to step S105.

At step S104, based on the functionality of the image generation section 62 and the display instruction section 64, before the vehicle 12 departs from the travel lane 70, a block-shaped stereoscopic image B is displayed at the display region of the third display section 26. Since this stereoscopic image B is displayed along the travel lane 70 ahead of the vehicle that is viewed through the third display section 26, it is possible to impart a visual effect to an occupant of the driver's seat as if a block-shaped stereoscopic object is disposed in the vicinity of the travel lane 70.

In particular, in the present exemplary embodiment, the stereoscopic image B is displayed along the boundary line at the lane departure direction side of the vehicle 12 in the travel lane 70. This enables an occupant of the driver's seat to recognize the direction of departure from the lane without moving his or her line of sight from the view ahead of the vehicle.

Figure 7:
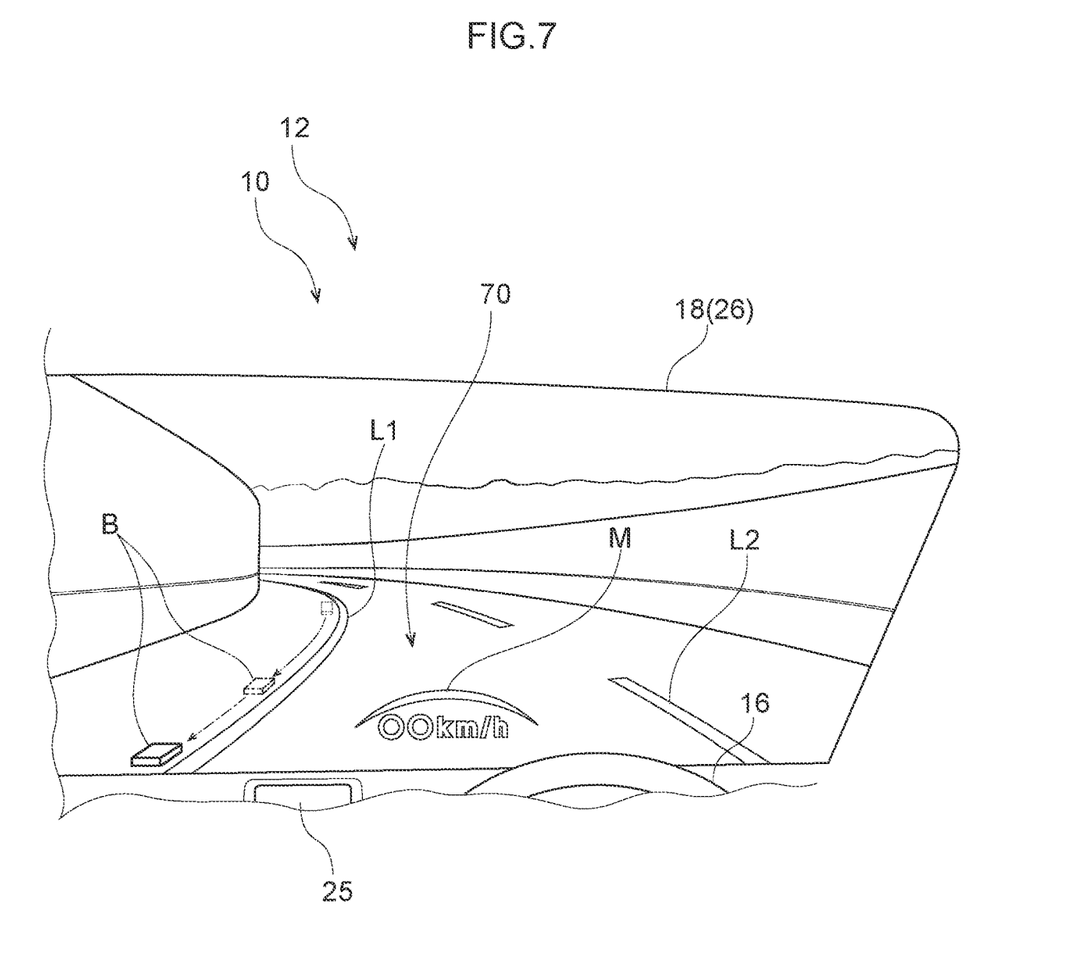
FIG. 7 is a diagram illustrating an example of a method of displaying an image of a single stereoscopic object displayed in a display region.
Figure 8:
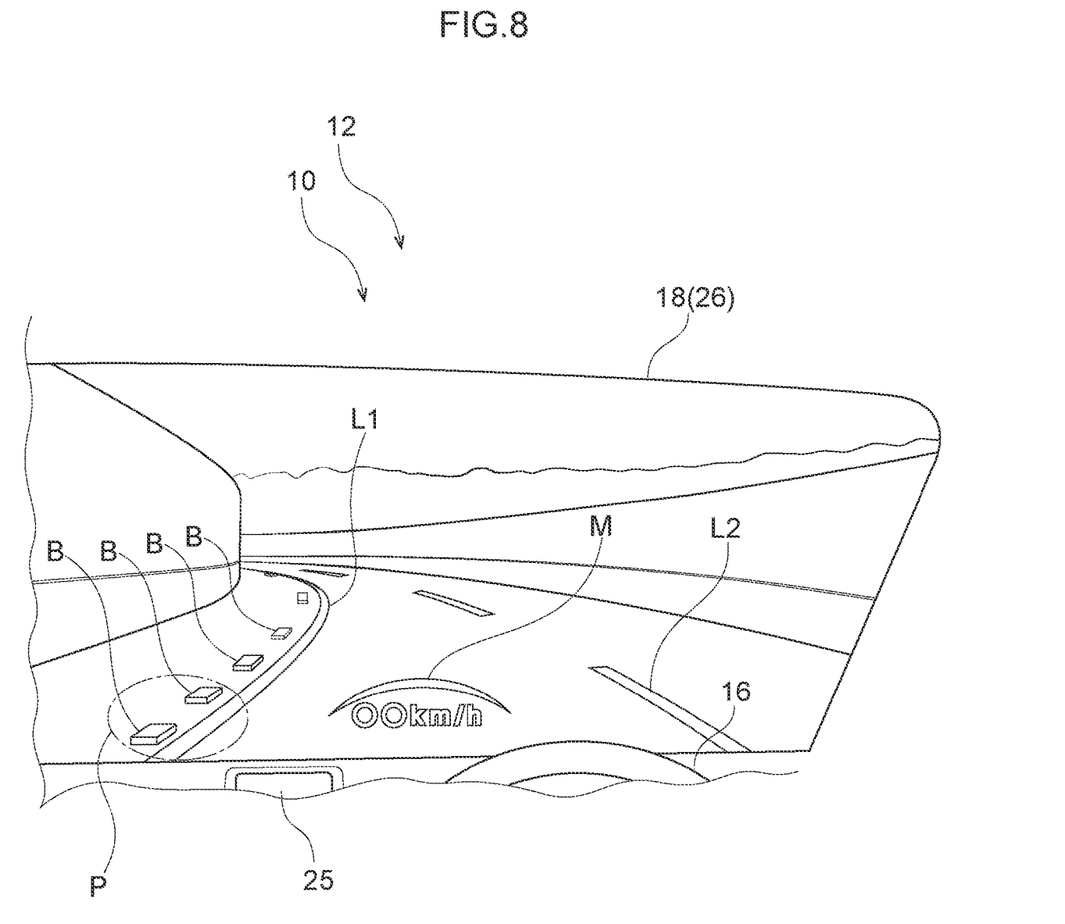
FIG. 8 is a diagram illustrating an example of a method of displaying images of plural stereoscopic objects displayed in a display region.
Figure 9:
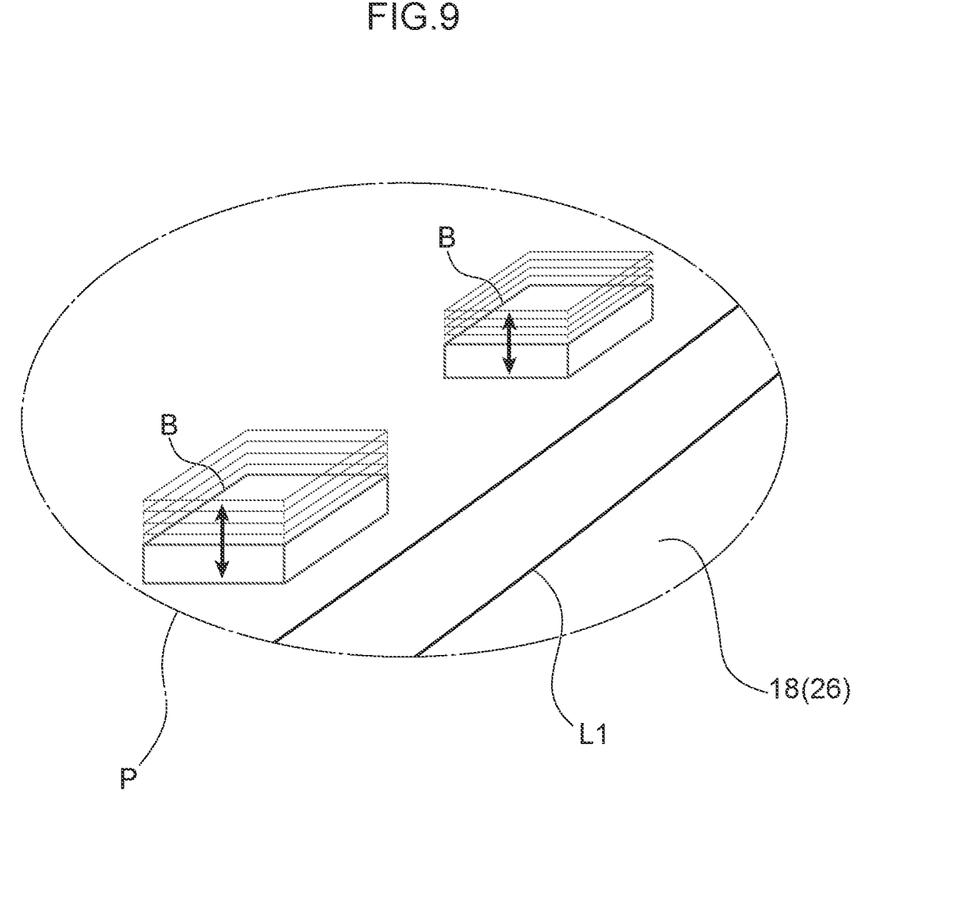
FIG. 9 is a partial enlarged view illustrating an example of a method of displaying an image of a stereoscopic object displayed in region P of FIG. 8.

Explanation follows regarding an example of display at the third display section 26 in a case in which it has been determined that there is a possibility of the vehicle 12 departing from the left side of the travel lane 70, with reference to FIG. 7 to FIG. 9.

As illustrated in FIG. 7, a block-shaped stereoscopic image B is displayed at the display region of the third display section 26 so as to be integrated with the travel lane 70 in the view ahead of the vehicle 12. The stereoscopic image B moves along the white line L1 at the left side in the path width direction so as to flow from a background side to a foreground side of the display region. Further, the stereoscopic image B is displayed in an enlarged manner as it moves from a background side in the display region to a foreground side. This enables a visual effect suggesting that the traveling vehicle 12 travels onto an approaching stereoscopic object to be imparted to an occupant of the driver's seat.

In the present exemplary embodiment, as illustrated in FIG. 8, the plural stereoscopic images B that move in terms of the operation described above are displayed at the display region of the third display section 26. Each of the plural stereoscopic images B moves so as to flow from a background side to a foreground side of the display region, and after this movement stops at the foreground side of the display region, the plural stereoscopic images B are displayed along the travel lane 70 aligned in a row. This enables a visual effect to be imparted to an occupant of the driver's seat as if a rumble strip is formed along the white line L1 at the (lefthand) side in the direction of departure of the vehicle 12.

As illustrated in an enlarged view in FIG. 9, the stereoscopic images B, the movement of which has stopped at a foreground side of the display region, are displayed as if vibrating in a vertical direction. This enables a realistic sensation as if the vehicle 12 is vibrating as a result of traveling over a three-dimensional object to be imparted to an occupant of the driver's seat who has viewed the third display section 26. At least one of the oscillation frequency or the oscillation amplitude may be changed in accordance with the distance D1 between the white lines L1, L2 and the vehicle 12 or the angle θ1 (see FIG. 4B) formed by the white lines L1, L2 and the travel direction of the vehicle 12. For example, as the distance D1 between the white lines L1, L2 and the vehicle 12 decreases, the oscillation frequency can be reduced or the oscillation amplitude increased, enabling the visual effect imparted to the occupant to be enhanced.

Although explanation has been given regarding an example in which the stereoscopic image B is caused to oscillate in a vertical direction in FIG. 9, there is no limitation thereto, and the stereoscopic image B may be oscillated in a lateral direction or an oblique direction.

As described above, in the vehicle display device 10 according to the present exemplary embodiment, the travel lane in which the vehicle 12 is traveling and the position of the vehicle 12 relative to the travel lane are recognized, and based on these factors, it is determined whether or not there is a possibility of the vehicle 12 departing from the travel lane. Further, in a case in which the vehicle display device 10 has determined that there is a possibility of departure from a travel lane, the stereoscopic image B disposed along the travel lane is displayed at the display region. This enables the vehicle display device 10 to impart, to an occupant, a visual effect as if the vehicle 12 is traveling across a three-dimensional object, and therefore, the risk of lane departure can be intuitively conveyed.

Further, in the vehicle display device 10 according to the present exemplary embodiment, as illustrated in FIG. 4A, in a case in which the vehicle 12 has approached the white lines L1, L2 indicating the boundary line in the path width direction of the travel lane 70, it is determined that there is a possibility of the vehicle 12 departing from the travel lane 70. As a result, in a case in which the vehicle 12 is traveling in a state in which there is a high likelihood of departure from the travel lane, the occupant can be made aware of the risk of lane departure.

Further, in the vehicle display device 10 according to the present exemplary embodiment, as illustrated in FIG. 4B, in a case in which the angle θ1 formed by the white lines L1, L2 indicating the boundary line in the path width direction of the travel lane 70 and the travel direction of the vehicle 12 is equal to or greater than a predetermined threshold value, it is determined that there is a possibility of the vehicle 12 departing from the travel lane 70. As a result, in a case in which the vehicle 12 has proceeded along a travel lane with a sharp curve, for example, while the vehicle 12 is traveling along a route that is highly likely to depart from the travel lane, the occupant can be made aware of the risk of departure from the lane.

Further, in the present exemplary embodiment, before the vehicle 12 departs from the travel lane 70, the stereoscopic image B is displayed at the display region of the third display section 26, enabling the occupant to be made aware of the danger. This enables effective prevention of lane departure accidents caused by the vehicle 12.

Further, in the present exemplary embodiment, since the stereoscopic image B is displayed so as to move along the travel lane 70 (white lines L1, L2) from a background side to a foreground side of the display region, the occupant can experience a realistic sensation as if the stereoscopic object disposed on the travel path is approaching the vehicle. This enables the vehicle display device 10 to more effectively impart, to the occupant, a visual effect as if the vehicle 12 is traveling over a three-dimensional object.

Moreover, in the present exemplary embodiment, an oscillating stereoscopic image B is displayed at the display region, enabling the occupant to experience a realistic sensation as if the vehicle is vibrating as a result of traveling over a three-dimensional object. This enables the vehicle display device 10 to more effectively impart, to the occupant, a visual effect suggesting that the vehicle 12 is traveling over a three-dimensional object.

Further, in the present exemplary embodiment, in accordance with the distance D1 between the white lines L1, L2 of the travel lane 70 and the vehicle 12 or the angle θ1 formed by the white lines L1, L2 and the travel direction of the vehicle 12, the oscillation frequency or oscillation amplitude of the stereoscopic image B can be changed. This enables the intensity of the visual effect imparted to the occupant to be adjusted in accordance with the likelihood of lane departure. For example, by shortening the oscillation frequency or increasing the oscillation amplitude of the stereoscopic image B as the distance D1 between the white lines L1, L2 of the travel lane 70 and the vehicle 12 decreases, the visual effect in terms of an occupant feeling as if the vehicle 12 has traveled over a three-dimensional object can be improved. This enables the vehicle display device 10 to make an occupant intuitively aware of the degree of risk of lane departure.

Further, in the present exemplary embodiment, the display region of the third display section 26 that shows the view ahead of the vehicle is configured as the projection plane of the head-up display device 44 provided at the front of the vehicle relative to the driver's seat. Further, the stereoscopic image B is displayed along the travel lane 70 that is viewed through the display region. In this manner, since the vehicle display device 10 displays stereoscopic objects so as to be integrated with the view ahead of the driver's seat of the vehicle, the occupant of the driver's seat can recognize the risk of lane departure without significantly moving his or her line of sight from the view ahead.

[Supplementary Explanation]

Figure 10:
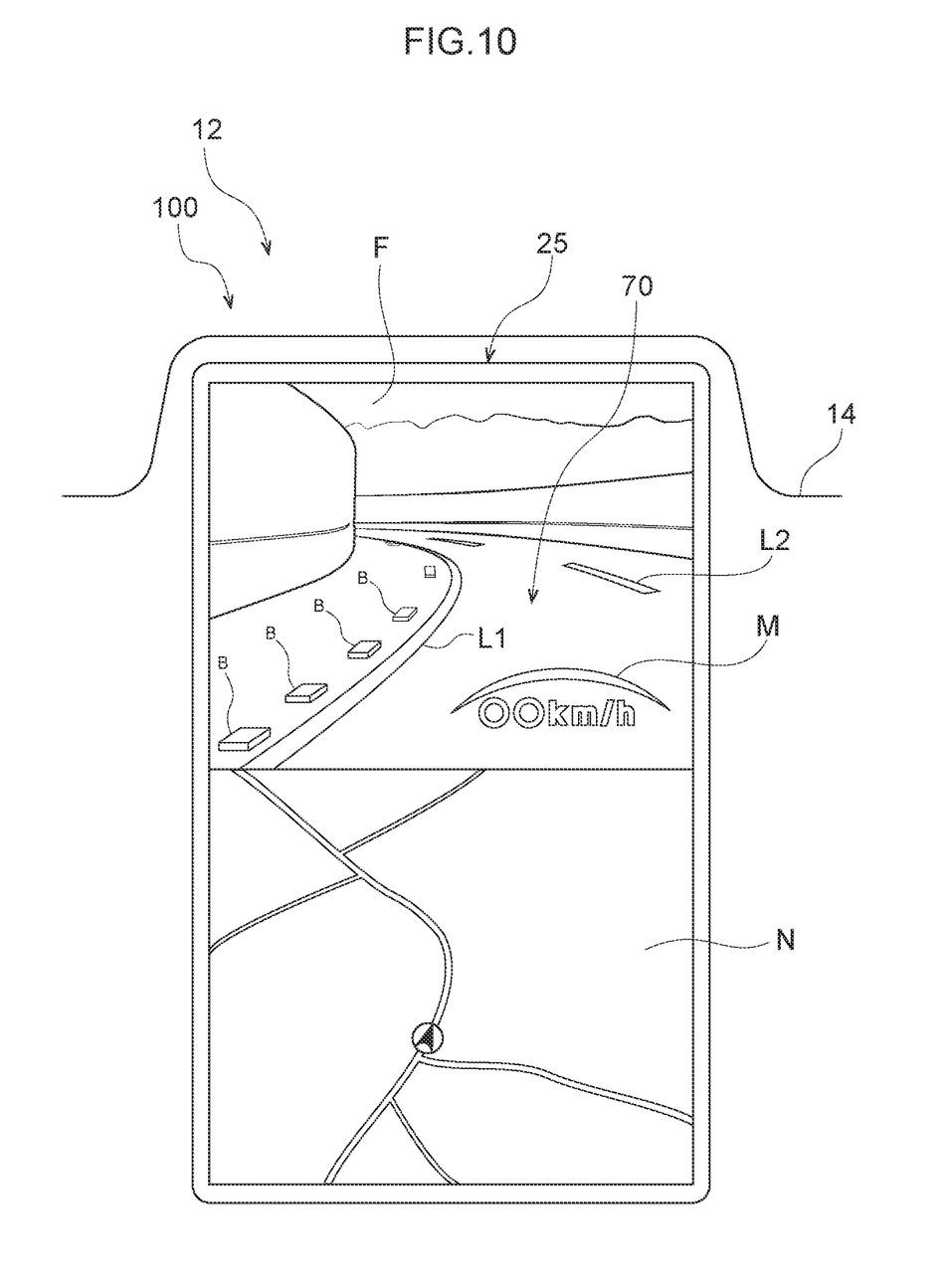
FIG. 10 is a schematic diagram illustrating a vehicle display device according to a modified example of the present exemplary embodiment.

Although explanation has been given regarding a case in which the display region showing the view ahead of the vehicle is configured by the projection plane of the head-up display device 44 in the exemplary embodiment described above, the present disclosure is not limited thereto. As in the vehicle display device 100 according to the modified example illustrated in FIG. 10, the stereoscopic image B may be displayed at a display region of the second display section 25, which is a display that is provided at the instrument panel 14. The second display section 25 illustrated in FIG. 10 displays a map image N indicating the current position of the vehicle 12 at a lower portion of the display region, and a forward view image F indicating the view ahead of the vehicle at an upper portion of the display region. The forward view image F is configured, for example, by an image acquired from a camera (not shown) that captures images ahead of the vehicle 12, or by a forward view image consisting of animation. The stereoscopic image B is displayed along the travel lane 70 of the vehicle 12 included in the forward view image F. This enables a vehicle occupant who has viewed the second display section 25 to experience a visual effect with a sensation as if the vehicle 12 has traveled over a three-dimensional object, regardless of their seating position.

Similarly, on the instrument panel 14, the stereoscopic image B may be displayed at a display region of the first display section 24, which is a meter display provided at the front of the vehicle in relation to the driver's seat. Since the first display section 24 is provided at the front of the vehicle in relation to the driver's seat, an occupant of the driver's seat can view the first display section 24 almost without moving his or her line of sight from the view ahead of the vehicle, and the visual effect in terms of the sensation that the vehicle 12 has traveled over a three-dimensional object can be enhanced.

Although explanation has been given regarding a configuration in which plural stereoscopic images B are displayed at the display region in the above exemplary embodiment, the present disclosure is not limited thereto. Alternatively, one stereoscopic image B may be displayed at the display region. Further, the stereoscopic image B is not limited to a block shape, and can be changed to a variety of shapes. For example, the stereoscopic image may be a wall shape standing upright from a boundary line in the path width direction of the travel lane 70.

Although the stereoscopic image B, the movement of which has stopped at the foreground side of the display region, is displayed so as to oscillate in the exemplary embodiment described above, the stereoscopic image displayed in the background of the display region may be displayed so as to be moved to the foreground while being oscillated.

Although the stereoscopic image B is displayed along the boundary line (in FIG. 7, the white line L1) on the departure direction side of the vehicle in the travel lane 70 in the exemplary embodiment described above, the present disclosure is not limited thereto. In a case in which it is determined that there is a possibility of the vehicle departing from the travel lane 70, the stereoscopic image B may be displayed along the boundary lines on both sides of the travel lane 70 in the path width direction.

It should be noted that the display processing and the lane change display processing executed by the CPU reading and executing software (a program) in the exemplary embodiment described above may be executed by various types of processor other than a CPU. Such processors include programmable logic devices (PLD) that allow the circuit configuration to be modified post-manufacture, such as a field-programmable gate array (FPGA), and dedicated electric circuits, these being processors including a circuit configuration custom-designed to execute specific processing, such as an application specific integrated circuit (ASIC). Further, the display processing and the lane change display processing may be executed by any one of these various types of processor, or by a combination of two or more of the same type or different types of processor (such as plural FPGAs, or a combination of a CPU and an FPGA). The hardware structure of these various types of processors is more specifically an electrical circuit combining circuit elements such as semiconductor elements.

Although explanation has been given regarding an aspect in which the programs for display processing and lane change display processing are stored (installed) in advance in the ROM or storage in the exemplary embodiment described above, there is no limitation thereto. Programs may be provided in a format recorded on a recording medium such as a compact disc read only memory (CD-ROM), a digital versatile disc read only memory (DVD-ROM), or a universal serial bus (USB) memory. Alternatively, the programs may be provided in a format downloadable from an external device over a network.

What is claimed is:

1. A vehicle display device that displays a predetermined image at a display region indicating a forward view of a vehicle, the device comprising:
    a memory; and
    a processor coupled to the memory, the processor being configured to:
    recognize a travel lane in which the vehicle is traveling;
    recognize a position of the vehicle relative to the travel lane;
    based on the travel lane and the position of the vehicle that are recognized by the processor, determine whether or not a possibility of the vehicle unintendedly departing from the travel lane exceeds a predetermined threshold; and
    in a case in which it has been determined that the possibility of the vehicle unintendedly departing from the travel lane exceeds the predetermined threshold, before the vehicle departs from the travel lane, display, at the display region, an image of a stereoscopic object disposed along and in proximity to a boundary line indicating a position of a boundary side, towards which the vehicle has been determined to have the possibility of unintendedly departing the travel lane, in such a manner that, while causing the image of the stereoscopic object to appear to vibrate, changes at least one of an oscillation frequency or an oscillation amplitude of the image of the stereoscopic object in accordance with a distance between the vehicle and the boundary line.

2. The vehicle display device of claim 1, wherein the processor is configured to determine that the possibility of the vehicle unintendedly departing from the travel lane in a case in which a distance between the vehicle and a boundary line in a path width direction of the travel lane is equal to or less than a predetermined threshold value.

3. The vehicle display device of claim 1, wherein the processor is configured to determine that possibility of the vehicle unintendedly departing from the travel lane in a case in which an angle, formed by a boundary line in a path width direction of the travel lane and a travel direction of the vehicle, is equal to or greater than a predetermined threshold value.

4. The vehicle display device of claim 1, wherein the processor is configured to display the image of the stereoscopic object at the display region before the vehicle departs from the travel lane.

5. The vehicle display device of claim 1, wherein the processor is configured to display the image of the stereoscopic object at the display region, such that the stereoscopic object appears to move along the travel lane from a background side to a foreground side of the display region.

6. The vehicle display device of claim 1, wherein:
the display region is configured as a projection plane projected by a heads-up display device at a front part of the vehicle relative to a driver's seat, and
the processor is configured to display the image of the stereoscopic object at the display region along the travel lane in a view ahead of the vehicle, as viewed through the display region.

7. The vehicle display device according to claim 1, wherein the processor is configured to:
in a case in which it has been determined that the possibility of the vehicle unintendedly departing from the travel lane exceeds the predetermined threshold, before the vehicle departs from the travel lane, display, at the display region, an image of a block-shaped stereoscopic object disposed on a road along the boundary line of the travel lane, so that the image of the block-shaped stereoscopic objet to appear to vibrate in a vertical direction in a manner that provides an occupant of the vehicle with a visual effect as if the vehicle has run over a three-dimensional object when the vehicle departs from the travel lane.

8. The vehicle display device according to claim 1, wherein the image of the stereoscopic object is displayed so as to move from a far side of the display region toward a near side thereof, thereby providing an occupant of the vehicle with a visual effect as if the stereoscopic object is approaching the vehicle.

9. A method of displaying a predetermined image at a display region showing a view ahead of a vehicle, the method comprising:
recognizing a travel lane in which a vehicle is traveling;
recognizing a position of the vehicle relative to the travel lane;
based on the travel lane and the position of the vehicle, determining whether or not a possibility of the vehicle unintendedly departing from the travel lane exceeds a predetermined threshold; and
in a case in which it has been determined that the possibility of the vehicle unintendedly departing from the travel lane exceeds the predetermined threshold, before the vehicle departs from the travel lane, displaying, at the display region, an image of a stereoscopic object disposed along and in proximity to a boundary line indicating a position of a boundary side, towards which the vehicle has been determined to have the possibility of unintendedly departing the travel lane, in such a manner that, while causing the image of the stereoscopic object to appear to vibrate, changes at least one of an oscillation frequency or an oscillation amplitude of the image of the stereoscopic object in accordance with a distance between the vehicle and the boundary line.

10. A non-transitory computer-readable storage medium storing a program executable by a processor to perform processing that causes a predetermined image to be displayed at a display region showing a view ahead of a vehicle, the processing comprising:
recognizing a travel lane in which a vehicle is traveling;
recognizing a position of the vehicle relative to the travel lane;
based on the travel lane and the position of the vehicle, determining whether or not a possibility of the vehicle unintendedly departing from the travel lane exceeds a predetermined threshold; and
in a case in which it has been determined that the possibility of the vehicle unintendedly departing from the travel lane exceeds the predetermined threshold, before the vehicle departs from the travel lane, displaying, at the display region, an image of a stereoscopic object disposed along and in proximity to a boundary line indicating a position of a boundary side, towards which the vehicle has been determined to have the possibility of unintendedly departing the travel lane, in such a manner that, while causing the image of the stereoscopic object to appear to vibrate, changes at least one of an oscillation frequency or an oscillation amplitude of the image of the stereoscopic object in accordance with a distance between the vehicle and the boundary line.

* * * * *